US008825199B2

(12) United States Patent
Girodet et al.

(10) Patent No.: US 8,825,199 B2
(45) Date of Patent: Sep. 2, 2014

(54) POSTAL SORTING MACHINE FOR MAILPIECES AND SEPARATORS, AND A METHOD FOR SORTING MAILPIECES AND SEPARATORS

(75) Inventors: Franck Girodet, Montelier (FR); Francois Madar, Bourg les Valence (FR); Mickael Dauvergne, Mercurol (FR); Bruno Cartal, Montelier (FR)

(73) Assignee: Solystic, Gentilly Cedex (FR)

( * ) Notice: Subject to any disclaimer, the term of this patent is extended or adjusted under 35 U.S.C. 154(b) by 57 days.

(21) Appl. No.: 13/583,848

(22) PCT Filed: Jul. 9, 2012

(86) PCT No.: PCT/FR2012/051612
§ 371 (c)(1),
(2), (4) Date: Sep. 10, 2012

(87) PCT Pub. No.: WO2013/007938
PCT Pub. Date: Jan. 17, 2013

(65) Prior Publication Data

US 2013/0090758 A1 Apr. 11, 2013

(30) Foreign Application Priority Data

Jul. 13, 2011 (FR) ..................................... 11 56404

(51) Int. Cl.
*G06F 7/00* (2006.01)

(52) U.S. Cl.
USPC ........... 700/223; 700/213; 700/218; 700/224; 700/228; 700/230

(58) Field of Classification Search
None
See application file for complete search history.

(56) References Cited

U.S. PATENT DOCUMENTS

2009/0048704 A1* 2/2009 Redford ........................ 700/224

OTHER PUBLICATIONS

International Search Report in PCT/FR2012/051612 dated Oct. 10, 2012, 2 pages.

* cited by examiner

*Primary Examiner* — Yolanda Cumbess
(74) *Attorney, Agent, or Firm* — Rothwell, Figg, Ernst & Manbeck, P.C.

(57) ABSTRACT

The invention relates to a postal sorting machine (101) for sorting mailpieces (1) and separators (2), which machine includes: sorting outlets (105); a first unstacker (102); a conveyor (104) for distributing said mailpieces (1) and said separators (2) between said sorting outlets (105); a second unstacker (103) for automatically unstacking at least one separator (2) on the basis of at least one predetermined criterion, and for inserting it into the stream of mailpieces (1), said conveyor (104) distributing said reinserted separator (2) to a certain predetermined sorting outlet (105); and a stacker (103) for stacking separators (2), which stacker is interposed between said first unstacker (102) and said second unstacker (103) for the purposes of extracting separators (2), of stacking them, of storing them, and of feeding said second unstacker (103) automatically. The invention also relates to a sorting method using said postal sorting machine (101).

10 Claims, 6 Drawing Sheets

POSTAL SORTING MACHINE FOR MAILPIECES AND SEPARATORS, AND A METHOD FOR SORTING MAILPIECES AND SEPARATORS

CROSS-REFERENCE TO RELATED APPLICATION(S)

This application is a 35 U.S.C. §371 National Phase Entry Application from PCT/FR2012/051612, filed Jul. 9, 2012, designating the United States and also claims the benefit of French Application No. 1156404, filed Jul. 13, 2011, the disclosures of which are incorporated herein by reference in their entirety.

TECHNICAL FIELD

The invention relates generally to a postal sorting machine for sorting mailpieces and separators, said postal sorting machine including at least: sorting outlets suitable for receiving said mailpieces and said separators in progressively formed stacks; a first unstacker suitable for automatically unstacking said mailpieces and said separators; a conveyor suitable for transporting said unstacked mailpieces and said unstacked separators towards said sorting outlets, and for distributing them between said sorting outlets on the basis of a predetermined sorting plan; and a second unstacker distinct from said first unstacker and suitable for automatically unstacking at least one separator on the basis of at least one predetermined criterion and for inserting it into the stream of mailpieces transported by said conveyor, said conveyor being suitable for distributing said reinserted separator to a certain predetermined sorting outlet. The conveyor may be a conveyor-belt conveyor that transports the mailpieces on edge and in series with a constant gap or with a constant pitch.

The invention also relates to a method of sorting mailpieces and separators, which method includes at least the following steps that are performed automatically: unstacking mailpieces and separators; transporting mailpieces and separators to sorting outlets; distributing mailpieces respectively to and between said sorting outlets and stacking them thereat on the basis of a predetermined sorting plan; and, on the basis of at least one predetermined criterion, unstacking a separator and inserting it into the stream of mailpieces, and distributing said inserted separator to a certain predetermined sorting outlet during a mailpiece and separator distribution and stacking step.

PRIOR ART

Postal sorting machines and postal sorting methods are in common use for sorting any type of mailpiece. Certain machines and methods are fully automatic, without any human intervention, while others include steps for which it is necessary for an operator to intervene.

Publication US 2009/0 048 704 describes a method of sorting and of tracking mailpieces, which method includes automatically unstacking the mailpieces that are transported in the form of a stream of mailpieces by means of a conveyor to sorting outlets at which trays are provided in which the mailpieces are stacked. That sorting machine also includes a separator unstacker that makes it possible for separators to be inserted automatically between certain mailpieces so that at least one separator is to be found in each tray. Those separators are tagged with RFID tags so that, during the transport or during any subsequent operation involving the trays, it is possible to identify the tray and the mailpieces. Thus, for example, when the trays go from one sorting center to another, it is possible to track them, to identify them, and to provide traceability for the mailpieces that each tray contains. Certain types of sorting require more than one sorting pass. In such sorting, after a first sorting pass, the tray containing the mailpieces and the associated separator is brought back to the inlet of the sorting machine. The sorting machine is provided with at least one reject outlet from which the unstacked separators are retrieved. Those separators can then be transferred manually to the separator unstacker. That sorting machine and its associated sorting method do not make it possible to re-circulate the separators automatically.

SUMMARY OF THE INVENTION

An object of the invention is to remedy those drawbacks by proposing a postal sorting machine for sorting mailpieces and separators and a method of sorting mailpieces and separators that make it possible to recirculate the separators automatically, said separators being used, in particular, for identifying the limits of stacks in the sorting outlets.

To this end, the invention therefore provides a postal sorting machine for sorting mailpieces and separators, said postal sorting machine including at least: sorting outlets suitable for receiving said mailpieces and said separators in progressively formed stacks; a first unstacker suitable for automatically unstacking said mailpieces and said separators; a conveyor suitable for transporting said unstacked mailpieces and said unstacked separators towards said sorting outlets, and for distributing them between said sorting outlets on the basis of a predetermined sorting plan; and a second unstacker distinct from said first unstacker and suitable for automatically unstacking at least one separator on the basis of at least one predetermined criterion and for inserting it into the stream of mailpieces transported by said conveyor, said conveyor being suitable for distributing said reinserted separator to a certain predetermined sorting outlet, said postal sorting machine being characterized in that it further includes a stacker for stacking separators, which stacker is interposed between said first unstacker and said second unstacker, and is controlled for the purposes of automatically extracting separators transported by said conveyor, of automatically stacking them, of automatically storing them, and of automatically feeding said second unstacker with separators. This separator stacker contributes to making it possible to recirculate separators during a subsequent sorting pass for sorting the mailpieces in the sorting outlets, which recirculated separators can be reinserted into the stream of mailpieces transported by the conveyor during a subsequent sorting pass. This thus contributes to reducing both the mailpiece sorting time and the labor costs, and also to minimizing the number of separators necessary for the postal sorting process.

Said stacker is preferably coupled to detection means suitable for detecting the presence of a separator that is being transported by said conveyor and that is not going to be used to separate a stack of mailpieces on the basis of said predetermined criterion and, in response to positive detection of such a separator, for causing said detected separator to be extracted.

In an advantageous embodiment, the postal sorting machine further includes determination means suitable for determining whether an unstacked mailpiece corresponds either to the first or to the last mailpiece of a certain stack of mailpieces to be formed in said certain sorting outlet, and, in response to positive determination of such a mailpiece, for controlling said second unstacker so that it automatically unstacks and inserts into the stream of conveyed mailpieces at least one separator that is going to be used to mark respectively the beginning or the end of said certain stack of mailpieces, said beginning or said end of said certain stack of mailpieces corresponding respectively to said predetermined criterion. The handling work of the operator is thus facilitated. Preferably, when the separators separate a stack beginning, in order to take hold of the first stack, the operator takes hold of the first separator and of the mailpieces situated after said first separator, between said first separator and the second separator, without taking hold of the second separator. The operator continues to proceed in this manner for the following stacks. The second separator thus serves as a marker for marking the beginning of a second stack. In this preferred situation, the contents of the stack are easily identified by means of the separator at the front of the stack. In a variant manner of use, when the separator separates the stack end, and in order to take hold of the corresponding stack, the operator takes hold of the mailpieces situated before the separator and of the separator in question.

Advantageously, said second unstacker and said stacker form an integrated stacker/unstacker for stacking/unstacking separators and share at least one common magazine for storing separators.

Said stacker/unstacker for stacking/unstacking separators may have at least one separator storage magazine of the Last In First Out (LIFO) type.

Said stacker/unstacker for stacking/unstacking separators may also have at least one separator storage magazine of the First In First Out (FIFO) type.

Said stacker is preferably connected to said conveyor via at least one separator outlet provided downstream from the sorting outlets in the direction of transport of the mailpieces in said conveyor, and said second unstacker is connected to said conveyor via at least one separator inlet provided downstream from said separator outlet, and upstream from said sorting outlets in the direction of transport of the mailpieces in said conveyor.

Said conveyor of said sorting machine of the invention may either be of the "open" type having an open conveying path or else be of the "closed" type having a closed-loop conveying path.

The invention also provides a method of sorting mailpieces and separators, which method includes at least the following steps that are performed automatically: unstacking mailpieces and separators; transporting mailpieces and separators to sorting outlets; on the basis of a predetermined sorting plan, distributing mailpieces between said sorting outlets and stacking them thereat; on the basis of at least one predetermined criterion, unstacking a separator and inserting it into the stream of mailpieces, and distributing said inserted separator to a certain predetermined sorting outlet during a mailpiece and separator distribution and stacking step, said method being characterized in that a separator extraction and stacking step for extracting and stacking at least one of said separators transported by said conveyor is performed automatically so that said separator unstacking and insertion step can be performed. Automatically recirculating the separators makes it possible to optimize the sorting efficiency of the mailpieces and to relieve the operator of the postal machine from the task of managing the separators. The number of separators necessary is also minimized by this recirculation.

Advantageously, upstream from said sorting outlets, at least one determination step is performed, during which it is determined whether an unstacked mailpiece corresponds either to the first or to the last mailpiece of a certain stack of mailpieces to be stored in a certain sorting outlet, the beginning or the end of the stack of mailpieces thus corresponding respectively to said predetermined criterion, and in that, in response to positive determination of such a mailpiece, said separator unstacking and insertion step is performed, thereby respectively causing said stack beginning or said stack end to be marked by said inserted separator. Marking stack beginnings and/or stack ends makes it possible to optimize the work of the operator by guiding the operator when taking hold of the stack. Determining the limit of a stack, namely the beginning of the stack (first mailpiece in the stack) or the end of the stack (last mailpiece in the stack), makes it possible to mark a stack of mailpieces to be transferred by the operator from a sorting outlet of the machine to a storage tray for storing mailpieces. The method of the invention thus makes it possible to separate the stacks of mailpieces as a function of the size of the container that is to receive them, e.g. a tray positioned facing the sorting outlet. The method of the invention also makes it possible to insert separators so that each stack does not exceed an overall size and/or a weight that are/is predetermined as a function of ergonomic criteria. The overall size and the individual weight of each of the mailpieces may also be measured by conventional means (thickness measurement device, weighing device, etc.) of the postal sorting machine. Automatically positioning this separator among the mailpieces stored in a sorting outlet reduces handling errors by the operator of the sorting machine so that the mailpieces stored by the operator in the mailpiece handling trays can be identified quite accurately, e.g. by a unique identifier contained in a RFID tag affixed to the separator which is itself stored in the tray with the stack of mailpieces.

In a preferred implementation, upstream from said sorting outlets, at least one detection step is performed during which it is detected whether at least one transported separator is not going to be used to separate a stack of mailpieces on the basis of said predetermined criterion, and in that, in response to positive detection of such a separator, said separator extraction and stacking step is performed by extracting said detected separator.

BRIEF DESCRIPTION OF THE DRAWINGS

The present invention can be better understood and other advantages appear on reading the following detailed description of two embodiments given by way of non-limiting example and with reference to the accompanying drawings, in which.

DESCRIPTION OF THE EMBODIMENTS

The postal sorting machines and the postal sorting method described below are designed for sorting any type of article, e.g. for sorting mailpieces, optionally previously separated by separators, so as to stack them in sorting outlets, in stacks separated by said separators, as a function of a predetermined sorting plan. The final sorting is obtained by performing a plurality of sorting passes. The sorting plan, on the basis of which the mailpieces are distributed to the sorting outlets is generally designed in such a manner that, at the end of the final sorting, the mailpieces are in an order consistent with the planned delivery round for those mailpieces. The sorting machine is advantageously a sorting machine that transports the mailpieces and the separators on edge and in series, by nipping them between belts. Two embodiments of the invention are described below. In the figures used, the mailpieces are represented symbolically by rectangles containing a cross, and the separators are represented symbolically by rectangles filled in in black.

Figure 1:
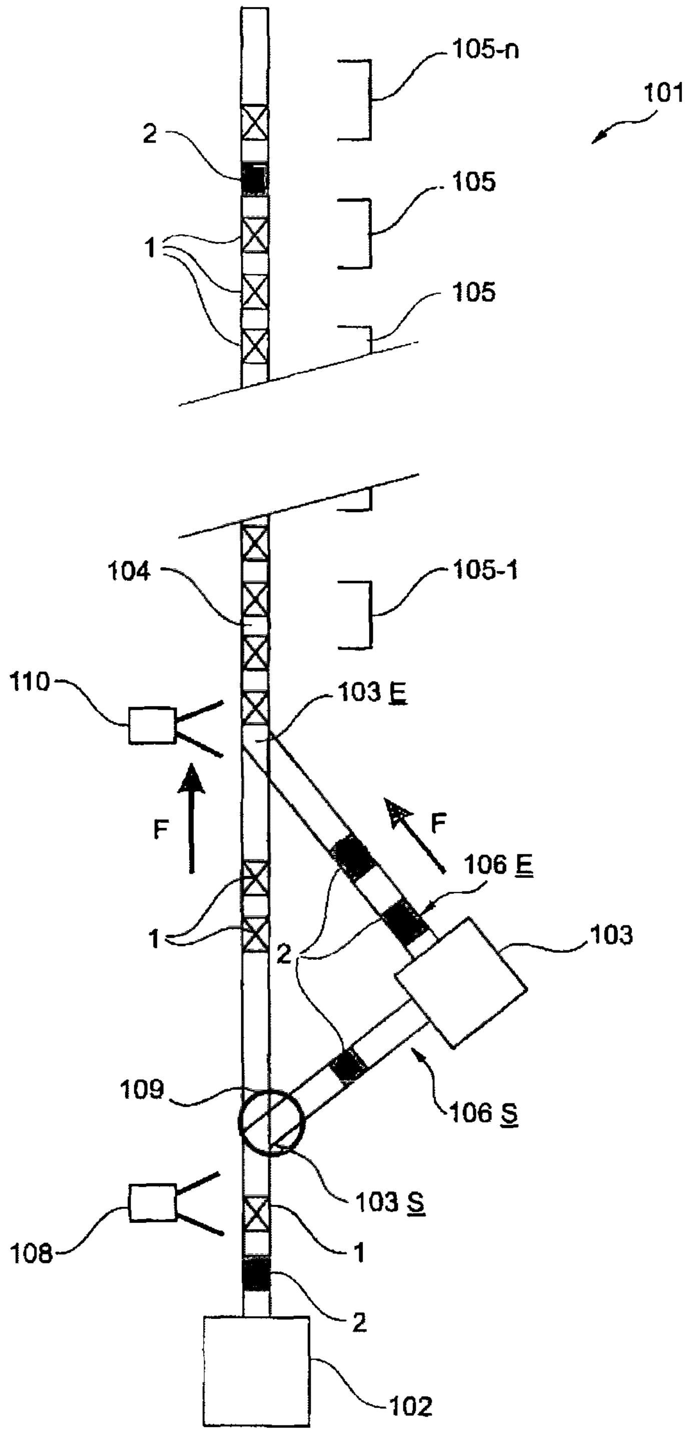
FIGS. 1 and 4 are fragmentary diagrammatic plan views of respective ones of two embodiments of postal sorting machines of invention.

In the first embodiment of the invention and with reference to FIG. 1, the postal sorting machine 101 includes a monitoring and control unit (not shown), a first unstacker 102, a stacker/unstacker 103, a conveyor 104, sorting outlets 105, detection means 108, determination means 110, and guide means 109.

The monitoring and control unit is of known type and makes it possible to control and regulate various elements of the postal sorting machine 101, such as those described below.

The first unstacker 102 is of a known combined type, and enables mailpieces 1 and separators 2 that are previously stacked, e.g. manually, to be unstacked automatically. Naturally, this first unstacker 102 is suitable for unstacking a stack of mailpieces 1 that does include any separator 2 and it is controlled by the monitoring and control unit. The first unstacker 102 may unstack the mailpieces 1 with a constant gap, i.e. with a constant distance between the rear edge of the upstream mailpiece 1 and the front edge of the downstream mailpiece 1. It may also be parameterized to unstack the mailpieces 1 with a varying gap.

The stacker/unstacker 103 combines a second unstacker and a stacker. In the present invention, the stacker/unstacker 103 is used to stack and to unstack separators 2. The stacker/unstacker 103 is automatic, distinct from the first unstacker 102, and controlled by the monitoring and control unit. Before it is used, the stacker/unstacker 103 may be loaded manually with separators 2. The stacker/unstacker 103 may also be loaded automatically with separators 2, e.g. after unstacking a stack of separators 2 by means of the first unstacker 102. As explained in detail below, the stacker/unstacker 103 is suitable for stacking separators 2 and for unstacking them automatically. It is connected to the conveyor 104 at a separator outlet 103S at which it is suitable for automatically extracting separators 2 conveyed by the conveyor 104 and for stacking them. This separator outlet 103S is provided between the first unstacker 102 and the first sorting outlet 105-1. The separator outlet 103S and the stacker/unstacker 103 are interconnected via an outgoing ancillary conveyor 106S suitable for transporting the separators 2 from the separator outlet 103S to the stacker/unstacker 103. The stacker/unstacker 103 can thus extract separators 2 from the stream of mailpieces 1 exiting from the first unstacker 102 upstream from the first sorting outlet 105-1. The separator stacker/unstacker 103 is also suitable for unstacking separators 2. It is connected at a separator inlet 103E to the conveyor 104 for the purpose of automatically inserting the unstacked separators 2 into the stream of conveyed mailpieces 1, as a function of at least one predetermined criterion. This separator inlet 103E is provided between the separator outlet 103S and the first sorting outlet 105-1. More generally, the separator inlet 103E must be provided before the sorting outlet(s) 105 between which it is possible for the separators 2 to be distributed. The "first sorting outlet" 105-1 thus means the first sorting outlet 105 that might receive such a separator 2. The stacker/unstacker 103 and the separator inlet 103E are interconnected by an incoming ancillary conveyor 106E suitable for transporting the separators 2 from the stacker/unstacker 103 to the separator inlet 103E. The stacker/unstacker 103 can thus insert separators into the stream of mailpieces 1, upstream from the first sorting outlet 105-1, which separators 2 can have been previously extracted from the stream of mailpieces 1.

For example, the sorting outlets 105 may be in the form of mail-case slots into which the mailpieces 1 and the separators 2 are progressively stacked on the basis of the predetermined sorting plan. These sorting outlets 105 are provided downstream from the separator inlet 103E and from the separator outlet 103S. The stacks (not shown) formed after a first sorting pass, at the sorting outlets 105, may be reinserted into the sorting machine 101 to be sorted again or into any other similar or different sorting machine. Optimum sorting is thus frequently obtained after two or three sorting passes. In the example shown, the sorting outlets 105 are distributed on one side of the conveyor 104 only. The sorting outlets 105 may be distributed on either side of said conveyor 104. The conveyor 104 may then have an elongate U-shape, on either side of which the sorting outlets 105 are distributed.

The conveyor 104 is of the "open" conveyor type having an open conveying path starting from the first unstacker 102. Said conveyor 104 is controlled by the monitoring and control unit so as to transport the mailpieces 1 and the separators 2 to the sorting outlets 105 and so as to distribute them, on the basis of the predetermined sorting plan, between the various sorting outlets 105 distributed over its length. The direction of movement of the mailpieces 1 and of the separators 2 is indicated by the arrows F.

For example, the detection means 108 may be in the form of a camera, of a RFID detector, of a bar code reader or of any other appropriate equipment suitable for detecting a separator that is, for example, previously tagged with a RFID tag, with a bar code, with a camera-detectable symbol or with any other suitable means. The detection means 108 are provided upstream from the separator outlet 103S and from the first sorting outlet 105-1 so as to detect the presence of one or more separators 2 to be extracted, upstream from the first sorting outlet 105-1.

The determination means 110 are provided upstream from the first sorting outlet 105-1 and are suitable for determining whether a conveyed mailpiece 1 corresponds either to a first or to a last mailpiece 1 of a certain stack of mailpieces 1 to be formed in a certain sorting outlet 105. For this purpose, the mailpiece 1 that is to be the first or the last mailpiece 1 may be tagged by any suitable tagging means so as to be identified by the determination means, such as, for example, a camera, a RFID detector, a bar code reader, or any other suitable equipment. When the determination means 110 are provided along the conveyor 104, they are provided downstream from the separator inlet 103E.

In an embodiment that is not shown, the first and/or last mailpieces are determined during a preceding sorting pass. During this sorting pass, a list may be established of the mailpieces to be unstacked, which list determines the first and/or last mailpieces of the stacks to be formed. The determination means then incorporate this pre-established list.

In another embodiment (not shown), the first and/or last mailpieces are known in advance, e.g. by means of a list associated with each batch of mailpieces presented at the inlet of the postal sorting machine and provided by the issuer of the batch. The determination means then also incorporate this pre-established list.

Figure 6:
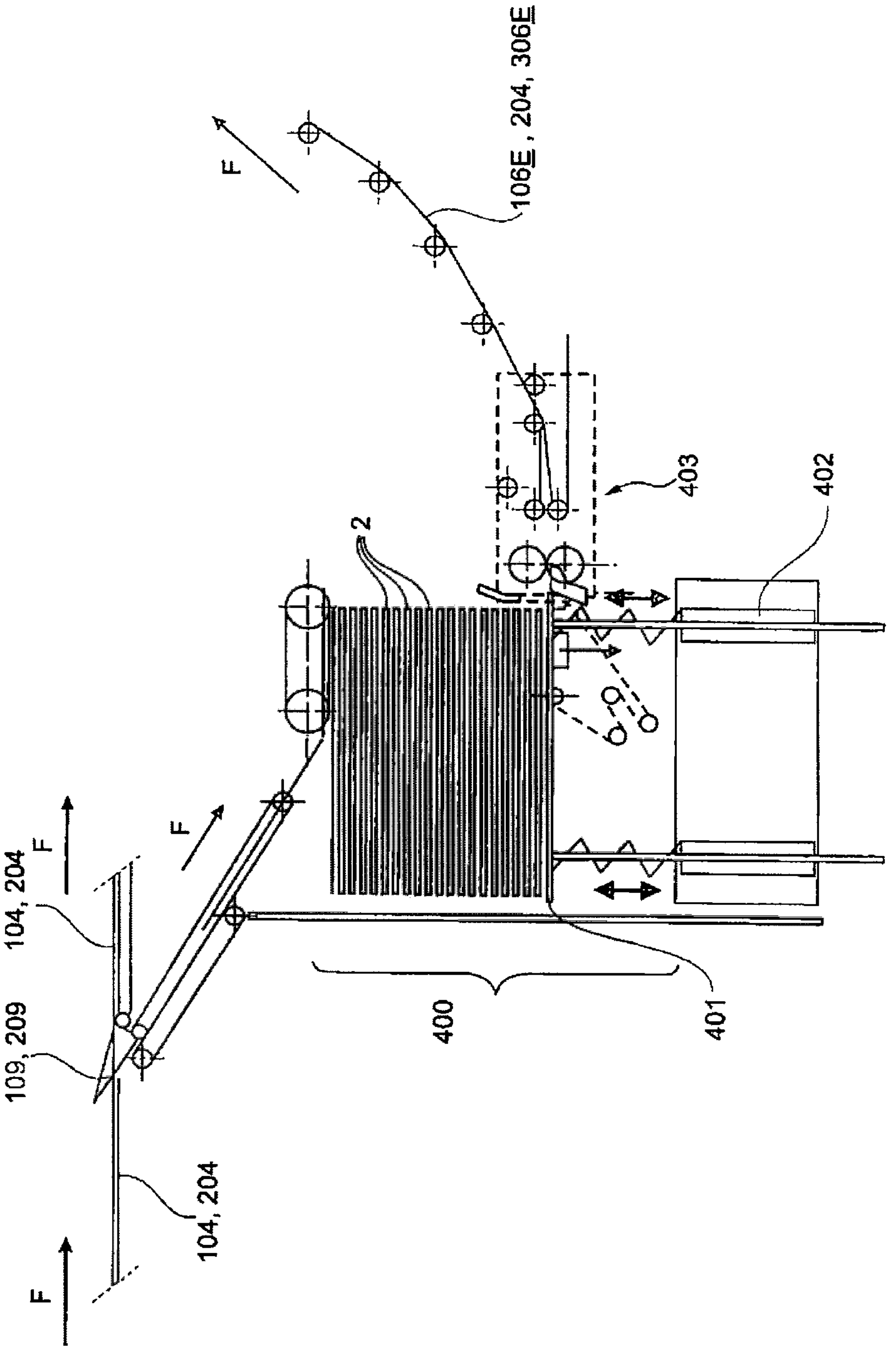
FIG. 6 is a diagrammatic elevation view of an embodiment of the stacker/unstacker of the invention.

The guide means 109, represented diagrammatically by a circle, comprise, for example, a pivotally mounted switch, as shown in FIG. 6. This pivotally mounted switch 109 can be pivoted in such a manner as to direct the stream in different predetermined directions. In this first embodiment, the pivotally mounted switch 109 can thus direct the stream directly towards the first sorting outlet 105-1 or towards the outgoing ancillary conveyor 106S and towards the stacker/unstacker 103, independently for each article transported by the conveyor 104. In general, these guide means 109 are considered as being part of the conveyor 104. Thus, when the detection means 108 detect a separator 2 downstream from the last sorting outlet 105-*n*, the guide means 109 guide said detected separator 2 towards the stacker/unstacker 103. In the absence of such detection, the guide means 109 guide the non-detected conveyed mailpieces 1 towards the sorting outlets 105 without going via the stacker/unstacker 103.

The postal sorting machine 101 further includes synchronization means (not shown) controlled by the monitoring and control unit and suitable for forming a space between two consecutive mailpieces 1 that are unstacked and that are flowing in the stream of mailpieces 1, this space being sufficient to insert one or more separators 2 between said two consecutive mailpieces 1. Generally, a single separator 2 is inserted between two mailpieces 1. It is also possible to insert two separators 2 in succession, one of which is to serve to separate an end of one stack of mailpieces 1, and the other to separate the beginning of a subsequent other stack of mailpieces 1. It is also possible to insert a higher number of separators 2. For example, the synchronization means include means for monitoring and varying the speed of the first unstacker 102, of the conveyor 104, of the stacker/unstacker 103, of the outgoing ancillary conveyor 106S and of the incoming ancillary conveyor 106E. The synchronization means also include means for suspending the action of the unstacker 102, making it possible to suspend unstacking. These synchronization means make it possible to synchronize the passing of the mailpieces 1 with the insertion of the separators 2 at each separator inlet 103E so that the gaps between the mailpieces 1 and the separators 2 make it possible to avoid any risk of jamming or of double takes, i.e. of two or more mailpieces going through as a bunch.

Figure 2:
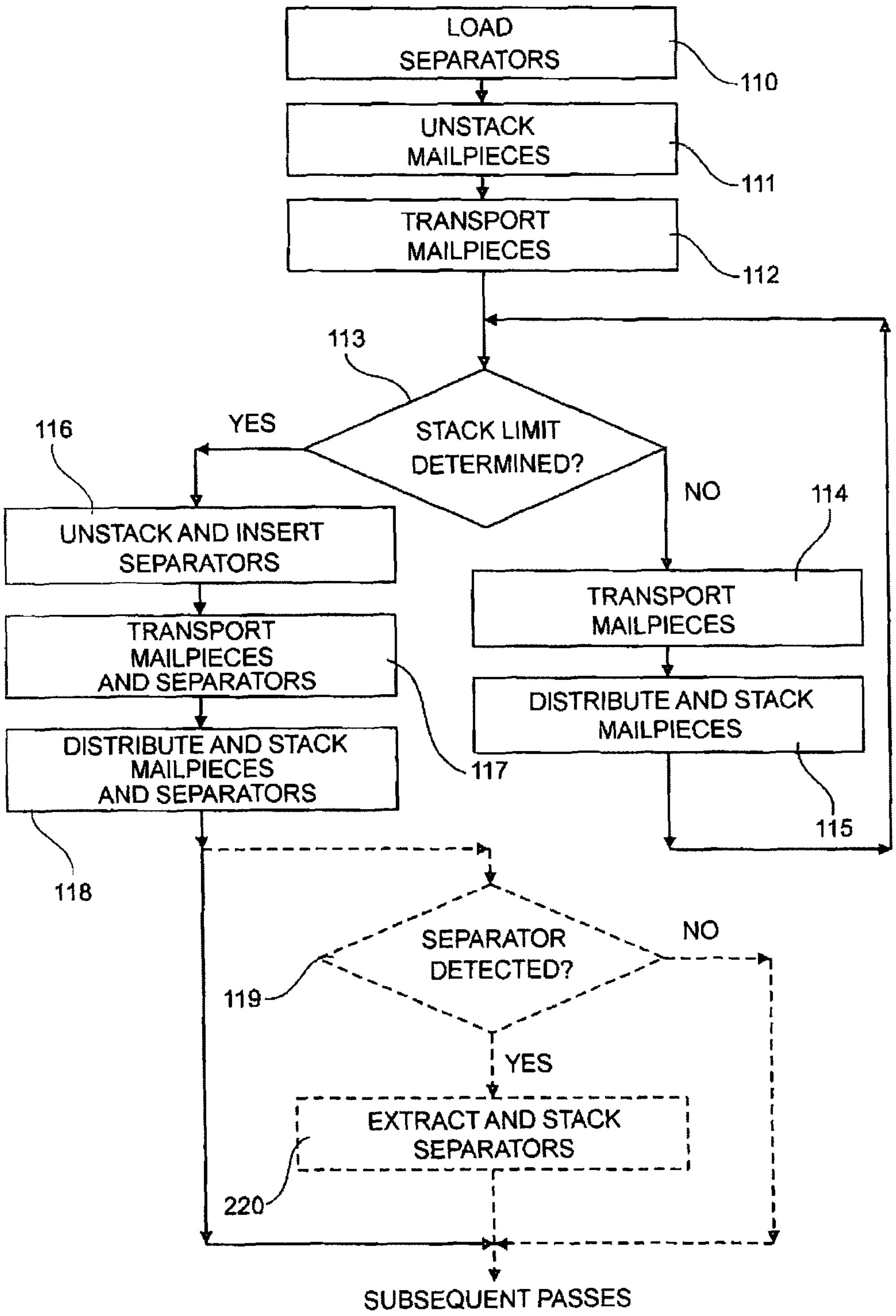
FIG. 2 is a flow chart of the steps of the first sorting pass of first and second implementations of the postal sorting method of the invention, the dashed portion corresponding to the second implementation.
Figure 3:
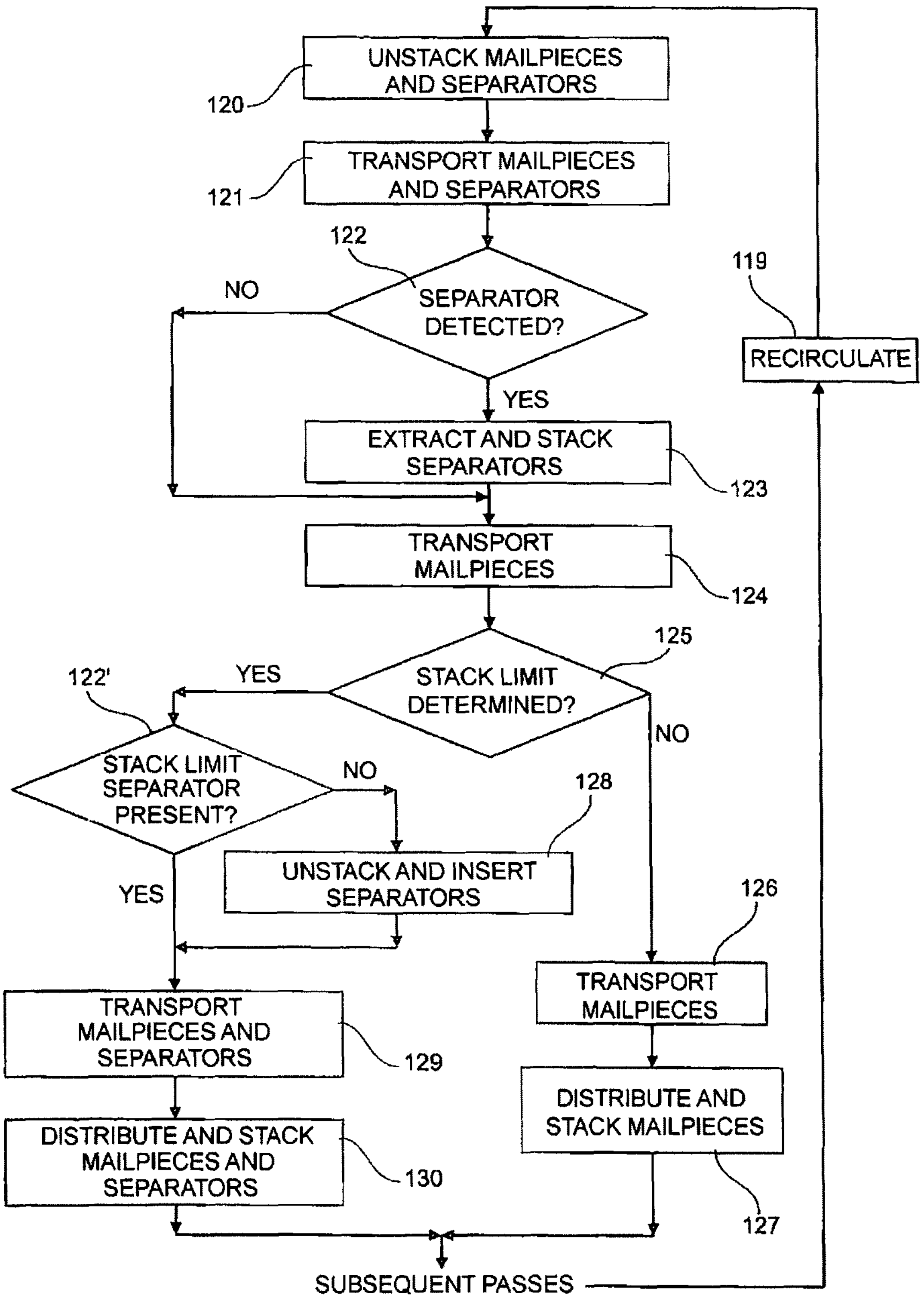
FIGS. 3 and 5 are flow charts of the steps of the second and subsequent passes of the first and second implementations of the postal sorting method of the invention.

The first implementation of the postal sorting method for the postal sorting machine 101 shown in FIG. 1 is described below, with reference to FIGS. 2 and 3. FIG. 2 describes the sorting method during the first sorting pass. FIG. 3 describes the steps of the sorting method during the second and subsequent sorting passes.

With reference to FIG. 2, during the first pass, a separator loading step 110 is performed, during which the separators 2 are stacked in the stacker/unstacker 103, manually or automatically. When it is chosen for the beginnings of the stacks to be separated, each sorting outlet 105 is fed manually or automatically with a beginning-of-stack separator 2. Then, a mailpiece unstacking step 111 is performed using the first unstacker 102. The mailpieces 1 are unstacked automatically, e.g. with a gap between them that is substantially constant. During a mailpiece transport step 112, using the conveyor 104, the unstacked mailpieces 1 are transported one behind another, in a stream of mailpieces 1, to the sorting outlets 105. Upstream from the first sorting outlet 105-1, a stack limit determination step 113 is performed, during which, by using the determination means 110, it is determined whether a mailpiece 1 unstacked and transported by the conveyor 104 corresponds either to the first or to the last mailpiece of a certain stack of mailpieces 1 to be stored in a certain sorting outlet 105. More generally, it is determined whether a mailpiece corresponds either to a first or to a last mailpiece before the sorting outlet that is to receive it. As described in detail above, this determination may be performed before the unstacking via a pre-established list of mailpieces.

In response to negative determination during the detection step 113 (no mailpiece 1 that is to be a stack beginning or a stack end), a mailpiece transport step 114 is performed that is similar to the mailpiece transport step 112, and during which the mailpieces 1 are transported to the sorting outlets 105. Then, during a mailpiece distribution and stacking step 115, stacks of mailpieces 1 are formed automatically at each sorting outlet 105 until a mailpiece 1 that is to be a stack beginning or a stack end is positively detected.

In response to positive determination during the determination step 113 (mailpiece 1 to be a stack beginning or a stack end), a separator unstacking and insertion step 116 is performed upstream from the first sorting outlet 105-1, during which step separators 2 are unstacked automatically and they are inserted into the stream of unstacked mailpieces 1 by suspending the unstacking performed by the first unstacker 102. The unstacking is obtained using the stacker/unstacker 103 and the separators 2 unstacked in this way are transferred to the conveyor 104 by means of the incoming ancillary conveyor 106E. These separators 2 are used to mark a stack beginning and/or a stack end depending on the chosen predetermined criterion. In a mailpiece and separator transport step 117, the unstacked mailpieces 1 and the inserted separators 2 are transported to the sorting outlets 105. The determination means 110 then serve to identify the unstacked separators 2, e.g. by reading the unique identifier carried by each separator 2 so as to be able to associate the separator 2 with the stack of mailpieces 1 that it is to separate. Then, during a mailpiece and separator distribution and stacking step 118, stacks of mailpieces 1 and separators 2 are formed automatically at each sorting outlet 105 as a function of the predetermined sorting plan. The beginnings and/or ends of stacks of mailpieces 1 are marked by the separators 2 depending on the chosen predetermined criterion. For example, the beginnings and the ends of stacks of mailpieces 1 may be predetermined as a function of the planned delivery round, of the thickness of each stack of mailpieces 1, of the weight of each stack of mailpieces 1, or of any other appropriate criterion. It is thus possible, at the sorting outlets 105, to form piles made up of a plurality of stacks of mailpieces 1, of contents predetermined on the basis of said criterion/criteria, and mutually separated by the separators. In particular, having the beginnings and/or the ends of stacks of mailpieces 1 marked by separators 2 makes it easier for an operator to identify said beginnings and ends of stacks of mailpieces 1, and, with the help of said separators 2, said operator can take hold of the correct contents of each stack of mailpieces 1. The separators 2 also facilitate any automatic transfer of the stack of mailpieces 1. All of the mailpieces 1 and separators 2 present on the conveyor 104 are distributed between the sorting outlets 105, at the latest at the last sorting outlet 105-*n*. Then the subsequent passes are performed. After the mailpiece and separator distribution and stacking step 118, the subsequent passes are performed as described below.

With reference to FIG. 3, in order to perform the second sorting pass and any other subsequent sorting passes, and during a recirculation step 119, the stacks of mailpieces 1 and separators 2 are retrieved from the sorting outlets 105 so as to reinsert them into the inlet of the first unstacker 102. This reinsertion may be manual or automated, and it is facilitated by the presence of the separators 2 that mark the separations between the stacks of mailpieces 1. Then, a mailpiece unstacking step 120 is performed using the first unstacker 102. This mailpiece and separator unstacking step 120 is substantially similar to the mailpiece unstacking step 111.

The mailpieces 1 and the separators 2 are unstacked automatically, e.g. with a gap between them that is substantially constant. Then, during a mailpiece and separator transport step 112, the unstacked mailpieces 1 and separators 2 are transported automatically one behind another to the sorting outlets 105. The mailpiece and separator transport step 121 is substantially similar to the mailpiece transport step 112. Upstream from the first sorting outlet 105-1, a detection step 122 is performed, during which, using the means 110, the presence of any separator(s) 2 being transported by the conveyor 104 and that is/are not going to be used to separate any of the stacks of mailpieces 1 on the basis of the predetermined criterion is detected. In response to positive detection (detection of a separator 2 that is not going to be used to mark a beginning or an end of a stack), and upstream from the first sorting outlet 105-1, a separator extraction and stacking step 123 is performed, during which the separators 2 previously detected and present on the conveyor 104 in the stream of mailpieces 1 are extracted automatically, and they are stacked using the stacker/unstacker 103. In another implementation (not shown), only some of the separators 2 are extracted, the other separators 2 continuing to advance towards the sorting outlets 105 without going through the stacker/unstacker 103. After the separator extraction and stacking step 123, a mailpiece transport step 124 that is similar to the mailpiece transport step 112 is performed.

In response to negative detection (no detection of any separator 2, or detection of separators 2 that are going to be used to mark stack beginnings or stack ends), a mailpiece transport step 124 that is described below is performed directly.

During the mailpiece transport step 124, the mailpieces 1 are transported alone or, where applicable, together with certain separators 2 that are going to be used to mark a stack beginning or a stack end, to the sorting outlets 105. Upstream from the first sorting outlet 105-1, a stack limit determination step 113 is performed, during which, by means of the determination means 110, it is determined whether a mailpiece 1 unstacked by the first unstacker 102 and transported by the conveyor 104 corresponds either to the first or to the last mailpiece 1 of a certain stack of mailpieces 1 to be stored in a certain sorting outlet 105.

In response to a negative determination (no mailpiece 1 that is to be a stack beginning or a stack end), a mailpiece transport step 126 is performed that is similar to the mailpiece transport step 114, and during which the mailpieces 1 are transported to the sorting outlets 105. Then, during a mailpiece distribution and stacking step 127, similar to the mailpiece distribution and stacking step 115, stacks of mailpieces 1 are formed automatically at each sorting outlet 105 until a mailpiece 1 that is to be a stack beginning or a stack end is positively determined.

In response to a positive determination (mailpiece 1 to be a stack beginning or a stack end), and in the absence of any separator 2 on the conveyor 104 that can mark the stack beginning or the stack end, a separator unstacking and insertion step 128 that is similar to the separator unstacking and insertion step 116 is performed upstream from the first sorting outlet 105-1. During this separator unstacking and insertion step 128, one or more separators 2 are inserted into the stream of mailpieces 1 by using the stacker/unstacker 103. At the beginning of the second pass or of a subsequent pass, the detection step 122 and the determination step 125 are performed in succession. After the beginnings of these passes, said detection step 122 and said determination step 125 are performed simultaneously. Thus, when the presence of a stack limit separator 122', namely a separator 2 transported by the conveyor 104 and that can mark a stack beginning or a stack end, is detected during the detection step 122, it is possible to allow said separator 2 to stay on the conveyor 104. This separator 2 is then not extracted during the separator extraction and stacking step 123 and is used to mark a stack beginning or a stack end in response to positive determination 125, without it being necessary to unstack another separator 2 during the separator unstacking and insertion step 128.

Then, during a mailpiece and separator transport step 129 similar to the mailpiece and separator transport step 117, the mailpieces 1 and the separators 2 are transported automatically to the sorting outlets 105. Finally, during a mailpiece and separator distribution and stacking step 130, stacks of mailpieces 1 and separators 2 are formed at each sorting outlet 105 as a function of the predetermined sorting plan and of the predetermined criterion. Thus, in the stacks formed at each sorting outlet 105, either the beginnings of stacks of mailpieces 1 or the ends of stacks of mailpieces 1, or else the beginnings and the ends of stacks of mailpieces 1 are marked. In order to obtain final sorting, these stacks can undergo one or more subsequent passes, in particular by means of the recirculation step 119. During this recirculation step 119, the stacks are brought from the sorting outlets 105 to the inlet of the first stacker 102. When the stacks of mailpieces 1 and separators 2 are taken manually, the work of the operator is facilitated by the presence of the separators 2 that mark the stack beginnings and/or stack ends. Similarly, when the stacks of mailpieces 1 and separators 2 are taken automatically, detecting the stack is facilitated by the presence of the separators 2 that mark the stack beginnings and/or stack ends.

Figure 4:
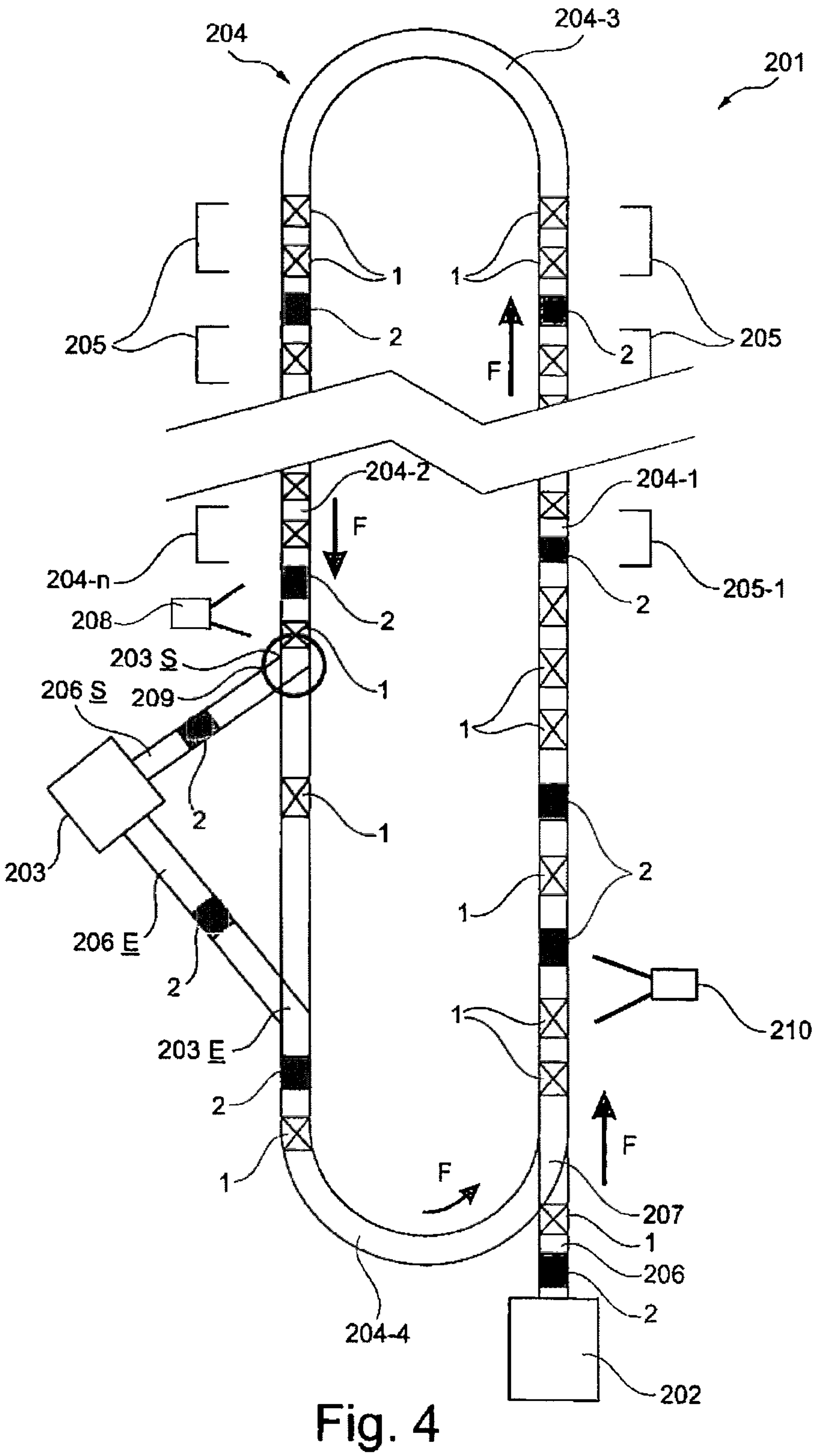

FIG. 4 shows a second embodiment of the postal sorting machine 201 of the invention. In this figure, the technical elements analogous to the technical elements shown in FIG. 1 are given the same reference numerals, plus 100. The postal sorting machine 201 includes a monitoring and control unit (not shown), a first unstacker 202, and a stacker/unstacker 203, an outgoing ancillary conveyor 206S, an incoming ancillary conveyor 206E, and sorting outlets 205 substantially similar to those of the postal sorting machine 101 of FIG. 1. The direction of movement of the mailpieces 1 and of the separators 2 is indicated by the arrows F. The postal sorting machine 201 also includes a conveyor 204, sorting outlets 205, detection means 208, and determination means 210.

The conveyor 204 is controlled by the monitoring and control unit so as to transport the mailpieces 1 and the separators 2 to the sorting outlets 205 and so as to distribute them between the various sorting outlets 205. The conveyor 204 is of the "closed" conveyor type having a closed-loop conveying path. This closed loop is made up of two straight branches 204-1, 204-2 interconnected by two U-turns 204-3, 204-4. In this example, the stacker/unstacker 203 is connected to the conveyor 204 upstream from the second U-turn 204-4. Naturally, the location of the stacker/unstacker 203 may be adapted to suit specific needs. Thus, in the example shown, the stacker/unstacker 203 is connected to the conveyor 204 at a separator outlet 203S at which it is suitable for automatically extracting separators 2 conveyed by the conveyor 204 and for stacking them. This separator outlet 203S is provided between the last sorting outlet 205-*n* and the second half-turn 204-4. The separator outlet 203S and the stacker/unstacker 203 are interconnected via an outgoing ancillary conveyor 206S suitable for transporting the separators 2 from the separator outlet 203S to the stacker/unstacker 203. The stacker/unstacker 203 can thus extract separators 2 from the stream of mailpieces 1 downstream from the sorting outlets 205. The separator stacker/unstacker 203 is also suitable for unstacking separators 2. It is connected at a separator inlet 203E to the conveyor 204 for the purpose of automatically inserting the unstacked separators 2 into the stream of conveyed mailpieces 1, as a function of at least one predetermined criterion. This separator inlet 203E is preferably provided between the separator outlet 203S and the second half-turn 204-4. The stacker/unstacker 203 and the separator inlet 203E are interconnected by an incoming ancillary conveyor 206E suitable for transporting the separators 2 from the stacker/unstacker 203 to the separator inlet 203E. The stacker/unstacker 203 can thus insert separators 2 into the stream of mailpieces 1, upstream from the second half-turn 204-4, and thus upstream from the first sorting outlet 205-1.

The first unstacker 202 is connected to the loop of the conveyor 204, at a point of confluence 207 via a conveyor portion 206 that is, for example, rectilinear. The separator stacker/unstacker 203 of the postal sorting machine 201 thus differs from the above separator stacker/unstacker mainly in that the conveyor 204 has a loop that does not go via the stacker/unstacker 203 and that makes it possible to transport the mailpieces 1, in parallel with the outgoing ancillary conveyor 206S and with the incoming ancillary conveyor 206E, without these mailpieces 1 going through the stacker/unstacker 203.

The sorting outlets 205 are distributed on either side of the straight branches 204-1, 204-2 of the conveyor 204. In another embodiment (not shown), sorting outlets may also be provided facing the U-turns. In another embodiment (not shown), sorting outlets may also be provided along one of the straight branches only.

The sorting machine 201 is also provided with detection means 208 and with determination means 210 that are substantially similar respectively to the detection means 108 and to the determination means 110. The determination means 210 are provided upstream from the first sorting outlet 205-1 and are suitable for determining whether a mailpiece 1 corresponds either to a first or to a last mailpiece 1 of a certain stack of mailpieces 1 to be formed in a certain sorting outlet 205. The detection means 208 are provided upstream from the separator outlet 203S and downstream from the last sorting outlet 205-*n* so as to detect the presence of one or more separators 2 to be extracted, upstream from the second U-turn 204-4. In some cases, the separator 2, detected by the detection means 208, is re-used "on the fly" if an occurrence of a first or last mailpiece of a stack has been determined simultaneously by the determination means 210. The sorting machine 201 also includes guide means 209 suitable for guiding the mailpieces 1 and separators 2, as a function of said detection, selectively towards the outgoing accessory conveyor 206S or towards the second U-turn 204-4. In general, these guide means 209 are considered as being part of the conveyor 204. Thus, when the detection means 208 detect a separator 2 downstream from the last sorting outlet 205-*n*, the guide means 209 guide said detected separator 2 towards the stacker/unstacker 203. In the absence of such detection, the guide means 209 guide the non-recognized conveyed mailpieces 1 towards the loop of the conveyor 204 formed by the second U-turn 204-4.

The second implementation of the postal sorting method for the postal sorting machine 201 shown in FIG. 4 is described below, with reference to FIGS. 2 and 5.

The first pass, shown by FIG. 2, includes a separator loading step 110, a mailpiece unstacking step 111, a mailpiece transport step 112, a stack limit determination step 113, a mailpiece transport step 114, a mailpiece distribution and stacking step 115, a separator insertion step 116, a mailpiece and separator transport step 117, and a mailpiece and separator distribution and stacking step 118, which steps are substantially similar to the steps of the first pass of the mailpiece sorting machine 101 of FIG. 1. The first pass of the postal sorting machine 201 of FIG. 2 differs from the above first pass mainly by the last steps, which are respectively a detection step 219 and a separator extraction and stacking step 220, which steps are shown in dashed lines in FIG. 2. The separator extraction and stacking step 220 is performed by means of the stacker/unstacker 203 provided upstream from the second U-turn 204-4 of the loop of the conveyor 204. The detection step 219 and the separator extraction and stacking step 220 are thus performed upstream from the first sorting outlet 205-1 and downstream from the last sorting outlet 205-*n* and in particular downstream from the point of confluence 207. The detection step 219 is substantially similar to the detection step 122, and is performed by using the detection means 208. Similarly, the separator extraction and stacking step 210 is substantially similar to the separator extraction and stacking step 120.

Figure 5:
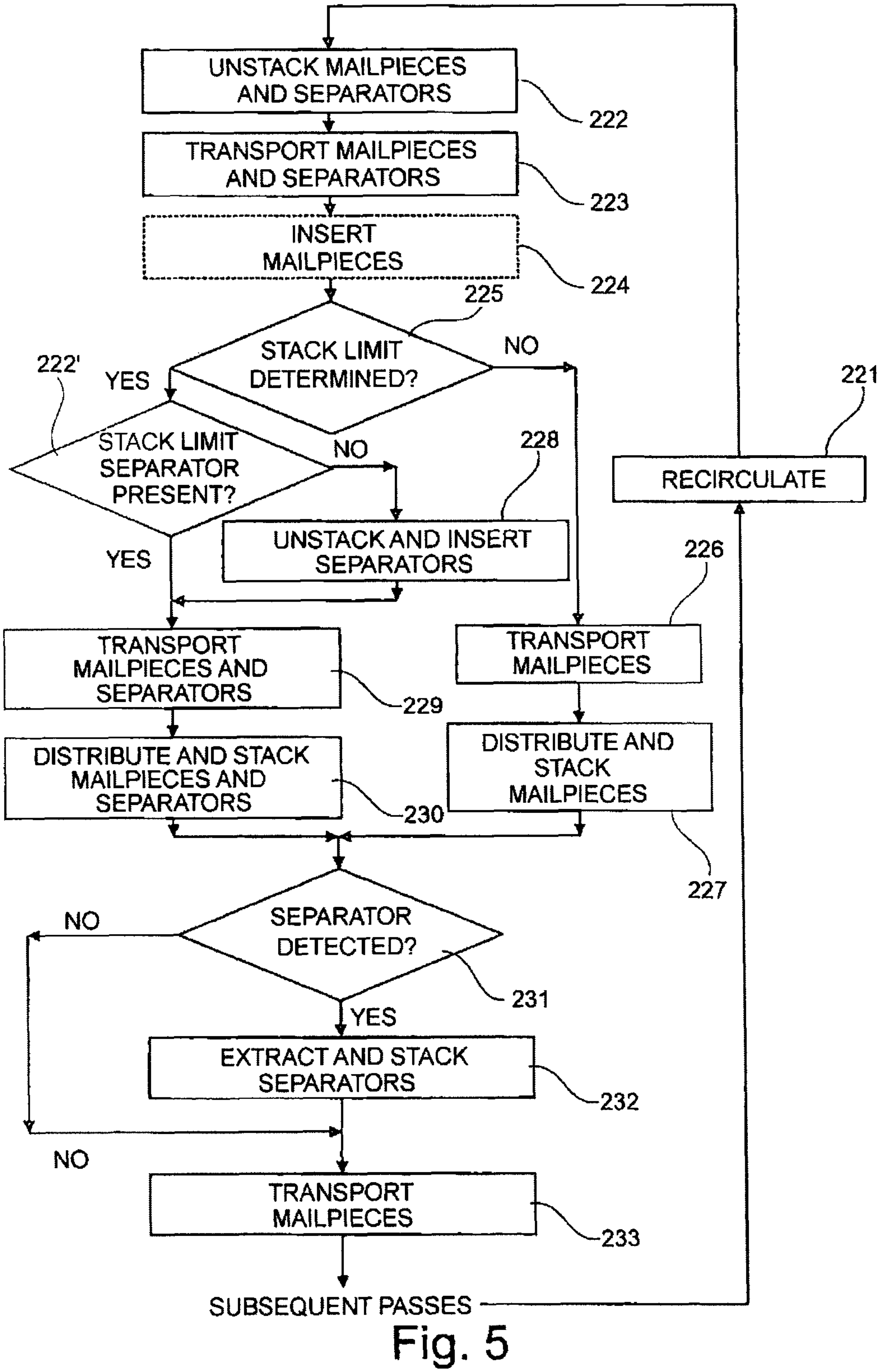

FIG. 5 describes the steps of the sorting method during the second sorting pass and subsequent sorting passes of the sorting machine 201. During a recirculation step 221, the stacks are retrieved from the sorting outlets 205 so as to reinsert them into the inlet of the first unstacker 202, as described above. The recirculation step 221 is thus substantially similar to the recirculation step 119. A mailpiece and separator unstacking step 222 is performed using the first unstacker 202. The mailpieces 1 and the separators 2 are unstacked automatically with a gap between them that is, for example, substantially constant. The mailpiece and separator unstacking step 222 is substantially similar to the mailpiece and separator unstacking step 120. During a mailpiece and separator transport step 223, the mailpieces 1 and the separators 2 are transported automatically one behind another to the sorting outlets 205. The mailpiece and separator transport step 223 is substantially similar to the mailpiece and separator transport step 121. Upstream from the first sorting outlet 205-1, during an optional mailpiece insertion step 224, mailpieces 1 coming from the loop of the conveyor 204 via the second U-turn 204-4 are inserted automatically into the stream of unstacked mailpieces 1 and separators 2. This optional step is shown in dashed lines in FIG. 5. Then, upstream from the first sorting outlet 205-1, a determination step 225 is performed that is substantially similar to the determination step 125 and, depending on the determination, a mailpiece transport step 226, a mailpiece distribution and stacking step 227, a separator unstacking and insertion step 228, a mailpiece and separator transport step 229, and a mailpiece and separator distribution and unstacking step 230 are performed, which steps are substantially similar respectively to the mailpiece transport step 126, to the mailpiece distribution and stacking step 127, to the separator unstacking and insertion step 128, to the mailpiece and separator transport step 129, and to the mailpiece and separator distribution and stacking step 130.

Then, downstream from the last sorting outlet 205-*n* and preferably upstream from the second U-turn 204-4, a detection step 231 is performed that is similar to the detection step 122. Depending on the detection, a separator extraction and stacking step 232 is performed that is substantially similar to the separator extraction and stacking step 123. Then, a mailpiece transport step 233 that is similar to the mailpiece transport step 124 is performed.

During the postal sorting method in one of its above-described implementations, provision is made to synchronize the passing of the mailpieces 1 and the insertion of the separators 2, in particular at the separator inlet 103E, 203E so as to form a space between the mailpieces 1 that is sufficient to insert the separators 2 between the mailpieces 1 spaced apart in this manner. Any risk of jamming and/or of double takes is thus avoided. For this purpose, for example, provision is made to vary the speed of the first unstacker 102, 202 and/or of the conveyor 104, 204, and/or of the stacker/unstacker 103, 203 and/or of the incoming ancillary conveyor 206E. In general, the invention makes provision to slow down, or indeed to stop the first unstacker 102, 202 so as to enable a separator 2 to be inserted. This operation may be supplemented by modifying the speed of the mailpieces 1 and/or the speed of the separators 2.

Certain other items of equipment of the postal sorting machine 101, 201 of the invention that are not shown are optional. For example, such items may be a multiple take detector, a thickness measurement device, a weighing device, a stiffness detector, a device for rejecting mailpieces that are too stiff, a bar code reader, image capture devices, or indeed print devices. In addition, the separators 2 may be provided with identification codes that are, for example, in the form of a RFID tag, or of a bar code, or of any other equivalent means making it possible to identify the separator 2 and to associate this identification with information relating to the mailpieces 1 belonging to the stack separated by the separator 2. When, at the sorting outlets 105, 205, the stacks of mailpieces 1 and of separators 2 are formed in trays (not shown), such trays may also be identified by means of the codes for identifying the separators 2.

With reference to FIG. 6, the postal sorting machine may be equipped with a stacker/unstacker 103, 203 of the First In First Out (FIFO) type, via which the separator 2 that is stacked first is the separator 2 that is unstacked first. This FIFO stacker/unstacker 103, 203 includes a magazine 400 in which the separators 2 are stacked on a plate 401 mounted on slides 402 suitable for moving the plate 401 horizontally as the separators 2 are being stacked so as to leave enough space behind the stack for stacking the following incoming separators 2. This FIFO stacker/unstacker 103, 203 also has an unstacking mechanism 403 coupled to the plate 401 so that, regardless of the state of fullness of the magazine 400, the unstacking mechanism 403 remains facing the separator 2 that is stacked first. The unstacking mechanism 403 is thus suitable for unstacking the separator 2 that is stacked first.

The postal sorting machine may also be equipped with a stacker/unstacker of the Last In First Out (LIFO) type (not shown), e.g. similar to the LIFO stacker/unstacker described in Publication US 2008/0 006 509.

The separators may also be of shape and/or of dimensions that are different from the shape and the dimensions of the mailpieces, or else be made of distinct materials, rendering them easier to identify.

In an embodiment (not shown), the postal sorting machine includes a separator stacker and a second unstacker that are separate from each other and that are connected to each other, e.g. by a conveyor, so that the magazine of the stacker can automatically feed the magazine of the second unstacker and so that the second unstacker can unstack the separators previously stacked by the separator stacker and/or any other separator inserted by any known means into the second unstacker. The magazines of the stacker and of the second unstacker are then not common.

Naturally, during the above-described recirculation steps 119, 221, it is possible to recirculate the stacks into the same sorting machine or into some other similar or different sorting machine.

The invention claimed is:

1. A postal sorting machine for sorting mailpieces and separators, said postal sorting machine comprising:

sorting outlets for receiving said mailpieces and said separators in progressively formed stacks;

a first unstacker for automatically unstacking said mailpieces and said separators;

a conveyor for transporting said unstacked mailpieces and said unstacked separators towards said sorting outlets, and for distributing them between said sorting outlets on the basis of a predetermined sorting plan;

a second unstacker distinct from said first unstacker and for automatically unstacking at least one separator on the basis of at least one predetermined criterion and for inserting it into a stream of mailpieces transported by said conveyor, said conveyor for distributing said reinserted separator to a certain predetermined sorting outlet; and a stacker for stacking separators, which stacker and said second unstacker form an integrated stacker/unstacker, and is controllable for automatically extracting separators transported by said conveyor, automatically stacking them, automatically storing them, and automatically feeding said second unstacker with separators.

2. A postal sorting machine according to claim 1, further comprising a detection means coupled with said stacker and for detecting the presence of a separator that is being transported by said conveyor and that is not going to be used to separate a stack of mailpieces on the basis of said predetermined criterion and, in response to positive detection of such a separator, for causing said detected separator to be extracted.

3. A postal sorting machine according to claim 1, further comprising a determination means for determining whether an unstacked mailpiece corresponds either to the first or to the last mailpiece of a certain stack of mailpieces to be formed in said certain sorting outlet, and, in response to positive determination of such a mailpiece, for controlling said second unstacker so that it automatically unstacks and inserts into the stream of conveyed mailpieces at least one separator that is going to be used to mark respectively the beginning or the end of said certain stack of mailpieces, said beginning or said end of said certain stack of mailpieces corresponding respectively to said predetermined criterion.

4. A postal sorting machine according to claim 1, wherein said second unstacker and said stacker form an integrated stacker/unstacker for stacking/unstacking separators and share at least one common magazine for storing separators.

5. A postal sorting machine according to claim 4, wherein said stacker/unstacker for stacking/unstacking separators comprises at least one separator storage magazine of the Last In First Out (LIFO) type.

6. A postal sorting machine according to claim 4, wherein said stacker/unstacker for stacking/unstacking separators comprises at least one separator storage magazine of the First In First Out (FIFO) type.

7. A postal sorting machine according to claim 1, further comprising at least one separator outlet provided downstream from the sorting outlets in the direction of transport of the mailpieces in said conveyor, and at least one separator inlet provided downstream from said separator outlet, and upstream from said sorting outlets in the direction of transport of the mailpieces in said conveyor, wherein said stacker is connected to said conveyor via said at least one separator outlet and wherein said second unstacker is connected to said conveyor via said at least one separator inlet.

8. A postal sorting machine according to claim 7, wherein said conveyor is of the "open" conveyor type having an open conveying path.

9. A postal sorting machine according to claim 7, wherein said conveyor is of the "closed" conveyor type having a closed-loop conveying path.

10. A method of sorting mailpieces and separators, which method includes at least the following steps that are performed automatically:

unstacking mailpieces and separators;

transporting mailpieces and separators to sorting outlets;

on the basis of a predetermined sorting plan, distributing and stacking mailpieces at sorting outlets; and on the basis of at least one predetermined criterion, unstacking a separator and inserting it into the stream of mailpieces, and distributing said inserted separator to a certain predetermined sorting outlet during a mailpiece and separator distribution and stacking step;

automatically extracting and stacking at least one of said separators transported by a conveyor so that the unstacking and the insertion of a separator into the stream of mailpieces can be performed;

wherein, upstream from said sorting outlets, at least one determination step is performed, during which it is determined whether an unstacked mailpiece corresponds either to the first or to the last mailpiece of a certain stack of mailpieces to be stored in a certain sorting outlet, the beginning or the end of the stack of mailpieces corresponds to said predetermined criterion, and in response to positive determination of such a mailpiece, said separator unstacking and insertion step is performed, thereby causing said stack beginning or said stack end to be marked by said inserted separator, and wherein, upstream from said sorting outlets, at least one detection step is performed during which it is detected whether at least one transported separator is not going to be used to separate a stack of mailpieces on the basis of said predetermined criterion, and in response to positive detection of such a separator, said extraction and stack of at least one of said separators are performed by extracting said detected separator.

* * * * *